United States Patent
Deng et al.

(10) Patent No.: US 11,303,485 B2
(45) Date of Patent: Apr. 12, 2022

(54) SIGNAL ACQUISITION METHOD AND DEVICE

(71) Applicant: BEIJING UNIVERSITY OF POSTS AND TELECOMMUNICATIONS, Beijing (CN)

(72) Inventors: Zhongliang Deng, Beijing (CN); Buyun Jia, Beijing (CN); Jun Mo, Beijing (CN); Xinmei Bian, Beijing (CN); Haijun Jiang, Beijing (CN); Shiwei Fan, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 82 days.

(21) Appl. No.: 16/647,171

(22) PCT Filed: Mar. 8, 2019

(86) PCT No.: PCT/CN2019/077451
§ 371 (c)(1),
(2) Date: Mar. 13, 2020

(87) PCT Pub. No.: WO2020/037974
PCT Pub. Date: Feb. 27, 2020

(65) Prior Publication Data
US 2020/0241148 A1  Jul. 30, 2020
US 2021/0231816 A9  Jul. 29, 2021

(30) Foreign Application Priority Data
Aug. 20, 2018  (CN) .......................... 201810949427.4

(51) Int. Cl.
*H04L 27/26* (2006.01)
(52) U.S. Cl.
CPC .................................. *H04L 27/26* (2013.01)

(58) Field of Classification Search
CPC ... H04L 27/26; H04L 27/0014; H04L 5/0053; H04L 5/0058; G01S 1/045; G01S 19/46
See application file for complete search history.

(56) References Cited

U.S. PATENT DOCUMENTS

| | | | | |
|---|---|---|---|---|
| 6,006,108 A | * | 12/1999 | Black | H04B 1/406 455/553.1 |
| 2005/0163201 A1 | * | 7/2005 | Krasner | H04B 1/707 375/150 |

(Continued)

FOREIGN PATENT DOCUMENTS

| | | |
|---|---|---|
| CN | 102087361 A | 6/2011 |
| CN | 102608626 A | 7/2012 |

(Continued)

OTHER PUBLICATIONS

Sahmoudi, Mohamed, et al., "Acquisition of Weak GNSS Signals Using a New Block Averaging Pre-Processing", May 2008, IEEE/ION Position, Location and Navigation Symposium, p. 1362-1372 (11 pages).

(Continued)

*Primary Examiner* — Ayaz R Sheikh
*Assistant Examiner* — Tarell A Hampton
(74) *Attorney, Agent, or Firm* — Daniel F. Nesbitt; Hasse & Nesbitt LLC (57) ABSTRACT

A signal acquisition method and device. Positioning signals as received are divided into at least two groups and frequency compensation is performed on each group of positioning signals. Each frequency compensated group of positioning signals is divided into at least two signal blocks, and an averaging operation is performed on the signal blocks in each group of signals, so as to obtain block-averaged groups of positioning signals. An acquisition result is determined based on the block-averaged groups of positioning signals. Noise power of each block-averaged group of signals is (Continued)

reduced. Therefore, noise power of received positioning signals can be reduced. This may improve signal-to-noise ratio of received signals and acquisition sensitivity of a receiver. Therefore, acquisition success rate of weak signals is increased.

12 Claims, 6 Drawing Sheets

(56) References Cited

U.S. PATENT DOCUMENTS

| | | | |
|---|---|---|---|
| 2006/0055596 A1* | 3/2006 | Bryant | G01S 19/06 342/357.64 |
| 2006/0071851 A1* | 4/2006 | Graas | G01S 19/37 342/357.395 |
| 2006/0078337 A1* | 4/2006 | Harley | H04B 10/077 398/186 |
| 2010/0073227 A1* | 3/2010 | Waters | G01S 19/246 342/357.48 |
| 2013/0177060 A1* | 7/2013 | Ben Ayun | H04B 1/109 375/224 |
| 2014/0176364 A1* | 6/2014 | Brauner | G01S 19/33 342/357.76 |
| 2015/0097729 A1* | 4/2015 | Subburaj | G01S 19/29 342/357.69 |
| 2016/0245923 A1* | 8/2016 | Badke | G01S 19/33 |
| 2016/0334493 A1* | 11/2016 | Lee | G01S 19/04 |

FOREIGN PATENT DOCUMENTS

| | | |
|---|---|---|
| CN | 104113502 A | 10/2014 |
| CN | 106646546 A | 5/2017 |
| CN | 107968757 A | 4/2018 |
| CN | 109085630 A | 12/2018 |

OTHER PUBLICATIONS

Yang, Peng-ju, et al., "Fast GPS acquisition algorithm based on the block accumulation and frequency compensation", Northwestern Polytechnical University of China, Jun. 2013, Electronic Design Engineering vol. 21 No. 12, p. 187-190 and 193 (5 pages) with English translation (9 pages).

Liu, Zhichao, "Research and Implementation ofWeakSignal Acquisition Algorithm for TC-OFDM Indoor Location Receiver, Chapter 4—Research on PMF-FFT Weak Signal Acquisition Algorithm", Mar. 18, 2018, Beijing University of Posts and Telecommunications—School of Electronic Engineering, p. 29-38 (11 pages) with English translation (12 pages).

International Search Report and Written Opinion dated May 30, 2019 for corresponding International Application No. PCT/CN2019/ 077451 filed Mar. 8, 2019 (5 pages) with WIPO machine English translation (5 pages).

* cited by examiner

SIGNAL ACQUISITION METHOD AND DEVICE

TECHNICAL FIELD

The present application relates to the technical field of signal acquisition, and in particular, a signal acquisition method and device.

BACKGROUND OF THE INVENTION

Currently, positioning technologies are widely used in various fields, such as military, transportation, and mapping. In a Time & Code Division-Orthogonal Frequency Division Multiplexing (TC-OFDM) system based on terrestrial mobile broadcast network, a positioning signal can be superimposed on a mobile broadcast signal or mobile communication signal and then broadcast by a base station. This can provide indoor and outdoor positioning with high precision. However, in an indoor environment with more obstacles, a positioning signal broadcast by a base station may undergo significant attenuation. This poses a challenge for a positioning receiver to acquire signals.

In prior art, the indoor acquisition of a weak signal may be improved by increasing the coherent integration time or non-coherent integration time. However, for an acquisition method using PMF-FFT (Partial Matching Filter-Fast Fourier Transformation) operation, FFT frequency search range may be reduced due to long coherent integration time. This may reduce the success rate of positioning signal acquisition.

SUMMARY OF THE INVENTION

An objective of embodiments of the present application is to provide a signal acquisition method and device to acquire indoor positioning signals with increased success rate. The following aspects are included.

In a first aspect, a signal acquisition method is provided, comprising: receiving positioning signals sent by a base station; dividing the positioning signals into at least two groups and performing frequency compensation on each group of positioning signals; dividing each frequency compensated group of positioning signals into at least two signal blocks, and performing an averaging operation on the signal blocks in each group of signals, so as to obtain block-averaged groups of positioning signals; and determining an acquisition result based on the block-averaged groups of positioning signals.

Optionally, dividing the positioning signals into at least two groups and performing frequency compensation on each group of positioning signals comprises: performing analog to digital conversion on the positioning signals sent by the base station, and sampling the positioning signals at a preset sampling rate; dividing the positioning signals into at least two groups based on a result of the sampling; and performing frequency compensation on each group of positioning signals, with a range for the frequency compensation being no more than one period of a pass-band.

Optionally, dividing each frequency compensated group of positioning signals into at least two signal blocks and performing an averaging operation on the signal blocks in each group of signals so as to obtain block-averaged groups of positioning signals comprises: dividing each frequency compensated group of positioning signals into at least two signal blocks, each of which comprising the same number of sampling points; for each group of positioning signals, performing an averaging operation on sampling points at the same positions in the signal blocks to obtain the block-averaged group of positioning signals.

Optionally, the frequency compensated group of positioning signal is represented by:

$$r^{(i)}(n)=Ad(nT_s)c(nT_s)e^{j(2\pi f_d^{(i)}nT_s+\varphi_0)}+v(nT_s)$$

wherein, n is a serial number of a sampling point, $r^{(i)}(n)$ is a signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ frequency compensated group of positioning signals, $T_s$ represents a period of signal sampling, $\varphi_0$ is a carrier phase, and $v(nT_s)$ is a noise of the $n^{th}$ sampling point; each block-averaged group of positioning signals is represented by:

$$r_B^{(i)}(n)=Ad(nT_s)c(nT_s)e^{j(2\pi f_d^{(i)}nT_s+\varphi_0)}H_B(f_d^{(i)})+v_B(nT_s)$$

wherein, n is a serial number of a sampling point, $r_B^{(i)}(n)$ is a block-averaged signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ group of positioning signals, $T_s$ represents a period of signal sampling, $\varphi_0$ is a carrier phase, $H_B(f_d^{(i)})$ is a block average response of the $i^{th}$ group of positioning signals, and $v_B(nT_s)$ is a component of a block-averaged noise at the $n^{th}$ sampling point.

Optionally, determining an acquisition result based on the block-averaged groups of positioning signals comprises: performing a partial matched filtering-fast Fourier transform (PMF-FFT) operation on each block-averaged group of positioning signals to obtain an amplitude-frequency response of each group of positioning signals; determining a peak to average ratio of each group of positioning signals based on the amplitude-frequency response of each group of positioning signals, the peak to average ratio of a group of positioning signals being a ratio of a maximum amplitude to an average amplitude in the amplitude-frequency response of the group of positioning signals, the average amplitude being an average of a preset number of amplitudes in the amplitude-frequency response of a group of positioning signals; determining a group of positioning signals that has the highest peak to average ratio among the at least two groups of positioning signals; determining the acquisition result to be successful if the highest peak to average ratio among the groups of position signals is higher than a preset threshold, and determining the acquisition result to be unsuccessful if the highest peak to average ratio among the groups of position signals is not higher than a preset threshold value; and if the acquisition result is determined to be successful, determining an estimated code phase and an estimated frequency of the positioning signals received from the base station based on the group of positioning signals that has the highest peak to average ratio among the at least two groups of positioning signals.

In a second aspect, a signal acquisition device is provided, comprising: a signal receiving module configured for receiving positioning signals sent by a base station; a frequency compensation module configured for dividing the positioning signals received by the signal receiving module into at least two groups and performing frequency compensation on each group of positioning signals; a block averaging module configured for dividing each frequency compensated group of positioning signals into at least two signal blocks, and performing an averaging operation on the signal blocks in each group of signals, so as to obtain block-averaged groups of positioning signals; and a determining module configured for determining an acquisition result based on the block-averaged groups of positioning signals.

Optionally, the frequency compensation module comprises a sampling unit, a grouping unit, and a frequency compensation unit.

The sampling unit is configured for performing analog to digital conversion on the positioning signals sent by the base station, and sampling the positioning signals at a preset sampling rate.

The grouping unit is configured for dividing the positioning signals into at least two groups based on a result of the sampling from the sampling unit.

The frequency compensation unit is configured for performing frequency compensation on each group of positioning signals divided by the grouping unit, with a range for the frequency compensation being no more than one period of a pass-band.

Optionally, the block averaging module is further configured for: dividing each frequency compensated group of positioning signals into at least two signal blocks, each of which comprising the same number of sampling points; for each group of positioning signals, performing an averaging operation on sampling points at the same positions in the signal blocks to obtain the block-averaged group of positioning signals.

Optionally, the frequency compensated group of positioning signal is represented by:

$$r^{(i)}(n)=Ad(nT_s)c(nT_s)e^{j(2\pi f_d^{(i)} nT_s+\varphi_0)}+v(nT_s)$$

wherein, n is a serial number of a sampling point, $r^{(i)}(n)$ is a signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ frequency compensated group of positioning signals, $T_s$ represents a period of signal sampling, $\varphi_0$ is a carrier phase, and $v(nT_s)$ is a noise of the $n^{th}$ sampling point; each block-averaged group of positioning signals is represented by:

$$r_B^{(i)}(n)=Ad(nT_s)c(nT_s)e^{j(2\pi f_d^{(i)} nT_s+\varphi_0)}H_B(f_d^{(i)})+v_B(nT_s)$$

wherein, n is a serial number of a sampling point, $r_B^{(i)}(n)$ is a block-averaged signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ group of positioning signals, $T_s$ represents a period of signal sampling, $\varphi_0$ is a carrier phase, $H_B(f_d^{(i)})$ is a block average response of the $i^{th}$ group of positioning signals, and $v_B(nT_s)$ is a component of a block-averaged noise at the $n^{th}$ sampling point.

Optionally, the determining module comprises a operation unit, a peak to average ratio determining unit, a determining unit, a decision unit, and a parameter estimating unit.

The operation unit is configured for performing a PMF-FFT operation on each block-averaged group of positioning signals to obtain an amplitude-frequency response of each group of positioning signals.

The peak to average ratio determining unit is configured for determining a peak to average ratio of each group of positioning signals based on the amplitude-frequency response of each group of positioning signals, the peak to average ratio of a group of positioning signals being a ratio of a maximum amplitude to an average amplitude in the amplitude-frequency response of the group of positioning signals, the average amplitude being an average of a preset number of amplitudes in the amplitude-frequency response of a group of positioning signals.

The determining unit is used for determining a group of positioning signals that has the highest peak to average ratio among the at least two groups of positioning signals.

The decision unit is configured for determining the acquisition result to be successful if the highest peak to average ratio among the groups of position signals is higher than a preset threshold, and determining the acquisition result to be unsuccessful if the highest peak to average ratio among the groups of position signals is not higher than a preset threshold value.

The parameter estimating unit is configured for, if the acquisition result is determined to be successful, determining an estimated code phase and an estimated frequency of the positioning signals received from the base station based on the group of positioning signals that has the highest peak to average ratio among the at least two groups of positioning signals.

In a third aspect, an electronic device is provided, comprising a processor, a communication interface, a memory, and a communication bus, wherein, the processor, the communication interface, and the memory are communicatively connected with each other via the communication bus.

The memory has a computer program stored thereon.

The processor executes the computer program to perform the operations of the method for signal acquisition described above.

In a fourth aspect, embodiments of the present application further provide a computer readable storage medium having a computer program stored thereon which, when executed by a processor, performs any of the methods for signal acquisition described above.

In a fifth aspect, embodiments of the present application further provide a computer program product which, when being executed by a computer, causes the computer to perform any of the methods for signal acquisition described above.

Embodiments of the present application provide a signal acquisition method and device. Positioning signals as received are divided into at least two groups and frequency compensation is performed on each group of positioning signals. Each frequency compensated group of positioning signals is divided into at least two signal blocks, and an averaging operation is performed on the signal blocks in each group of signals, so as to obtain block-averaged groups of positioning signals. An acquisition result is determined based on the block-averaged groups of positioning signals. Noise power of each block averaged group of signals is reduced. Therefore, noise power of received positioning signals can be reduced in the embodiment of the present application. This may improve signal-to-noise ratio of received signals and acquisition sensitivity of a receiver. Therefore, acquisition success rate of weak signals is increased.

The incorporation of frequency estimation and block averaging into signal acquisition can improve the precision of an estimated frequency. Embodiments of the present application can be used to obtain a more accurate estimated frequency during signal acquisition.

Of course, the implementation of any product or method of the present application does not necessarily have to achieve all the above-described advantages.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings in the following description are only for some embodiments of the present application, other drawings may be obtained by those of ordinary skill in the art without any creative effort based on these drawings.

DETAILED DESCRIPTION OF THE INVENTION

To make the objectives, technical solutions, and advantages of the present application more comprehensive, a detailed description of the present application is provided below in association with embodiments and with reference to drawings. Apparently, the described embodiments are only some of, but not all the embodiments of the present application. All other embodiments derived therefrom without any creative efforts are all within the scope of the present application.

Figure 1:
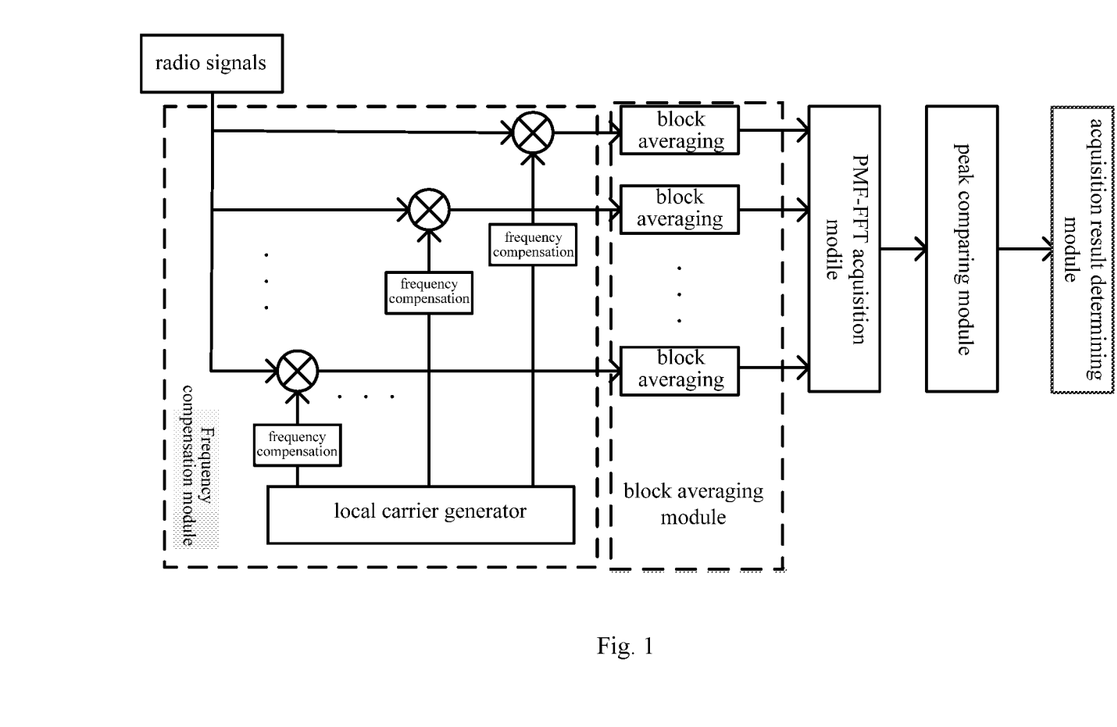
FIG. 1 is a schematic structural diagram of a PMF-FFT signal acquisition device based on frequency compensation and block averaging provided by an embodiment of the present application.

The signal acquisition method provided by embodiments of the present application is applicable to a signal acquisition device as shown in FIG. 1. The device can be embodied in an electronic device. The device may comprise a frequency compensation module, a block averaging module, a PMF-FFT acquisition module, a peak comparing module, and an acquisition result determining module.

The signal acquisition device may perform analog-digital conversion on received radio frequency positioning signals, and divide the converted positioning signal into multiple groups. The groups are then frequency compensated by the frequency compensation module. Subsequently, block averaging is performed on each of the frequency compensated groups of positioning signals by the block averaging module. The block-averaged groups of positioning signals are captured for calculation by the PMF-FFT acquisition module. The peak comparing module determines the highest peak-to-average ratio among the groups based on the result of the calculation. The acquisition result determining module determines an acquisition result based on the highest peak-to-average ratio.

In embodiments of the present application, the electronic device may be, for example, a computer, a mobile phone, or a tablet having a positioning capability.

Figure 2:
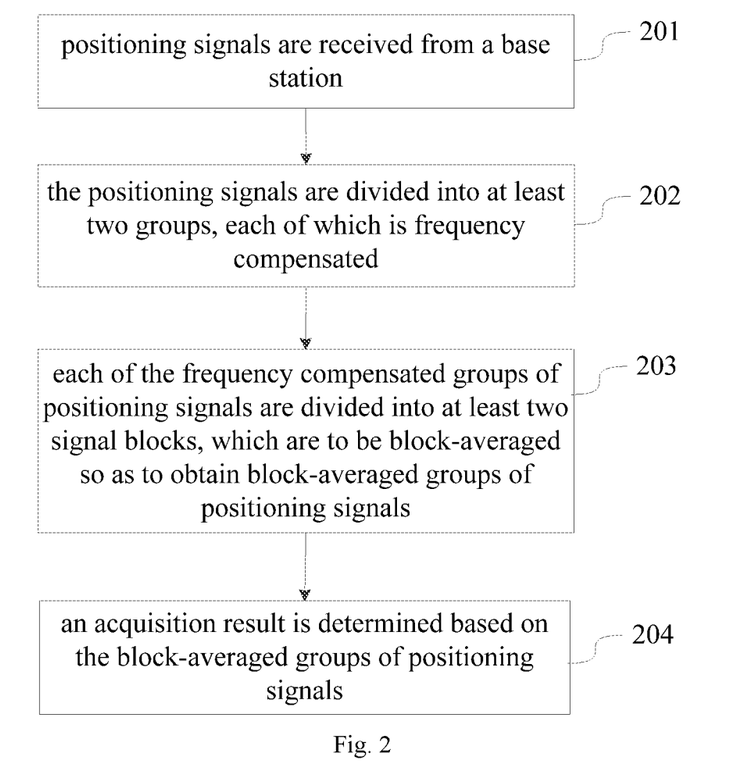
FIG. 2 is a flowchart of a signal acquisition method provided by an embodiment of the present application.

FIG. 2 is a flow chart of a signal acquisition method provided by an embodiment of the present application, which is applicable to the device in FIG. 1. As shown in FIG. 2, the method comprises the following operations.

At 201, positioning signals are received from a base station.

At 202, the positioning signals are divided into at least two groups, each of which is frequency compensated.

In one implementation, the positioning signals may be fed to the frequency compensation module as shown in FIG. 1, where the signals are subject to analog-to-digital conversion, sampled with a preset sampling rate, and then divided into X groups. Each group of signals contains sampling points of the same number. Then, the X groups of positioning signals are respectively multiplied with X groups of local carriers of different frequencies generated by a local carrier generator, to obtain X frequency compensated groups of positioning signals. The range of frequency compensation does not exceed a pass-band period, and X≥2.

At 203, each of the frequency compensated groups of positioning signals are divided into at least two signal blocks, which are to be block-averaged so as to obtain block-averaged groups of positioning signals.

The block averaging as shown in FIG. 1 may comprise the following operations. Each frequency compensated group of positioning signals is divided into at least two signal blocks that contain sampling points of the same number. For each group of positioning signals, sampling points at same positions within the signal blocks are averaged to obtain blocked averaged groups of positioning signals.

The length of a signal block is generally an integer multiple of the length of a PRN (Pseudo Random Noise Code) in a positioning signal. Further, as sampling points at corresponding positions in signal blocks in a group are averaged in block averaging, it is thus required that each signal block contains the same number of sampling points.

Figure 3:
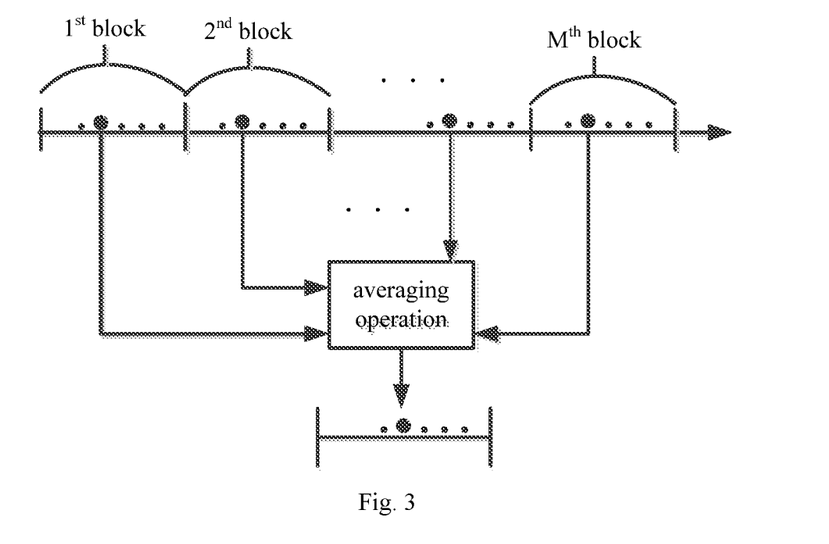
FIG. 3 is a flowchart of a block averaging method provided by an embodiment of the present application.

Referring to FIG. 3, which is a flow chart of a block averaging method provided by an embodiment of the present application. In one implementation, each group of positioning signals can be divided into M signal blocks, each of which containing N sampling points. A sampling point n in a first signal block of a group of signals is selected. Then, the other sampling points (n+iN) corresponding to the position of the sampling point n in other signal blocks are selected, wherein, i=0, 1, . . . (M−1). The sampling points n and (n+iN) are averaged so as to obtain a block-averaged group of positioning signals. The block-averaged groups of positioning signals are:

$$r_B^{(i)}(n) = \frac{1}{M} \sum_{i=0}^{M-1} r^{(i)}(n + iN) \qquad (1)$$
$$= Ad(nT_s)c(nT_s)e^{j(2\pi f_d^{(i)} nT_s + \varphi_0)} H_B(f_d^{(i)}) + v_B(nT_s)$$

wherein, n is a serial number of a sampling point, $r_B^{(i)}(n)$ is a block-averaged signal for an $n^{th}$ sampling point in an $i^{th}$ group of positioning signals, A is an amplitude of a signal, $d(nT_s)$ is a navigation message of the $n^{th}$ sampling point, $c(nT_s)$ is a pseudo random noise code of the $n^{th}$ sampling point, $f_d^{(i)}$ is a frequency of the $i^{th}$ group of positioning signals, $T_s$ is a signal sampling period, and $\varphi_0$ is a carrier phase.

$H_B(f_d^{(i)})$ is the block average response of the $i^{th}$ group of positioning signals and can be characterized by Formula (2):

$$H_B(f_d^{(i)}) = \frac{1}{M} \sum_{i=0}^{M-1} e^{j2\pi f_d^{(i)} i N T_s} = \left| \frac{\sin(\pi f_d^{(i)} N T_s M)}{M \sin(\pi f_d^{(i)} N T_s)} \right| e^{j2\pi f_d^{(i)} N T_s (M-1)} \quad (2)$$

The $V_B(nT_s)$ in Formula (1) is a component of block-averaged noise of the $n^{th}$ sampling point. Given that noise in a positioning signal is substantially Gaussian white noise, the power of the Gaussian white noise of a blocked averaged positioning signal is:

$$Var(v_{BA}) = \frac{1}{M^2} \sum_{i=0}^{M-1} Var(v) = \frac{1}{M} Var(v) \quad (3)$$

It can be seen from Formula (3) that, after block averaging, the power of the Gaussian white noise is reduced to 1/M compared with before, while the power of the positioning signal remains unchanged. A signal to noise ratio is defined by the following formula:

$$10*\log_{10}(S/N) \quad (4)$$

wherein, S is power of a positioning signal, and N is power of the Gaussian white noise. As depicted in FIG. 3, because the power of each group of positioning signals remains unchanged while the power of the Gaussian white noise of each group of positioning signals is reduced to 1/M compared with before. This thus increases the signal to noise ratio of a positioning signal received from a base station by $10 \log_{10}(M)$. Therefore, block averaging can enhance capability in weak signal acquisition.

At 204, an acquisition result is determined based on the block-averaged groups of positioning signals.

Optionally, an acquisition result can be determined in embodiments of the present application by means of PMF-FFT, a combination of Fast Fourier Transformation and Fast Inverse Fourier Transformation, or serial acquisition. However, embodiments of the present application are not limited in this aspect. Other methods of acquiring positioning signals can also be used to determine an acquisition result based on block-averaged groups of positioning signals in embodiments of the present application.

It can be seen that, in the signal acquisition method provided by an embodiment of the present application, positioning signals can be frequency compensated, block-averaged and then captured using a preset signal acquisition method. The power of the noise of each block-averaged group of positioning signals is reduced. Therefore, noise power of received positioning signals can be reduced in the embodiment of the present application. This may improve acquisition sensitivity of a receiver, and can increase acquisition success rate of weak signals.

Figure 4:
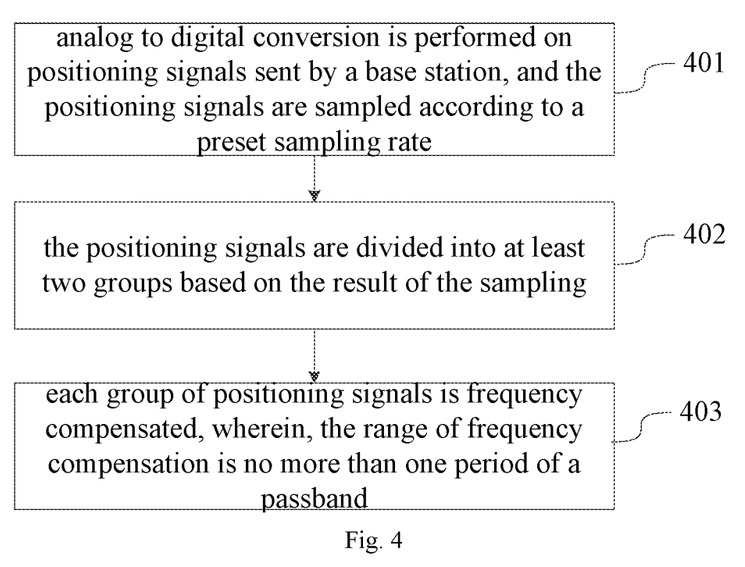
FIG. 4 is a flow chart of frequency compensation in a signal acquisition method provided by an embodiment of the present application.

Referring to FIG. 4, which is a flow chart of the frequency compensation in a signal acquisition method provided by an embodiment of the present application. The method comprises the following operations:

At 401, analog to digital conversion is performed on positioning signals sent by a base station, and the positioning signals are sampled according to a preset sampling rate.

Optionally, as described with reference to FIG. 2, the length of a block of signals for averaging is generally selected to be an integer multiple of the length of a PRN code in the positioning signals. Therefore, the sampling rate can be an integer multiple of the PRN code rate in the positioning signals. In a TC-OFDM system, a PRN code has a period of 2.5 ms, wherein, the rate and the period are reciprocals of each other.

At 402, the positioning signals are divided into at least two groups based on the result of the sampling.

Optionally, the positioning signals can be divided into X groups, each of which containing M*N sampling points, wherein, M is preset and represents number of signal blocks for block averaging, N is a constant parameter of the system and represents number of sampling points in a signal block for block averaging, and "*" represents the multiplying operation.

The length of a signal block is an integer multiple of the length of a period of the PRN code in the positioning signals. In particular, the length of a signal block can be equal to one period of the PRN code of the positioning signals. The PRN code used in a TC-OFDM system is a ranging code (weil code) that has a code length of 10230. The receiver samples the weil code at a rate that is 4.4 times the PRN code rate. Therefore, 45012 points are sampled for each period of the PRN code. In other words, each signal block contains 45012 sampling points.

A weil code is a ranging code generated from a Legendre series.

It should be noted that M and X are preset, and can be determined as following.

Figure 5:
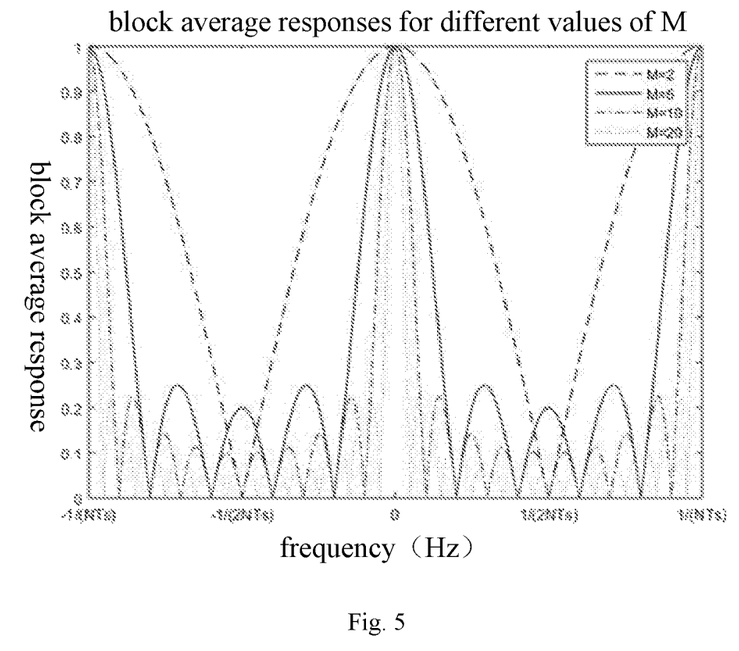
FIG. 5 is a schematic diagram of a block average response provided by an embodiment of the present application.

As shown in a schematic view of block average response in FIG. 5, the block average response has a pass-band, the main-lobe of which has a width of $2/NMT_s$. In case of a fixed difference between the frequency of a signal block and the central frequency of the main lobe of the block average response, the bigger M is, the sooner a positioning signal becomes attenuated. To prevent quick attenuation of positioning signals, the number of groups X for frequency compensation should be increased. A group of positioning signals that produce the smallest difference between a Doppler frequency of the positioning signals and a central frequency of the pass-band of a block average response is first obtained from the X groups of signals. Based on this group of positioning signals, a maximum attenuation function for amplitudes of positioning signals caused by frequency deviation is determined by equation (5) as following.

$$Los = \left| \frac{\sin(\pi N T_s M/(2XNT_s))}{M\sin(\pi N T_s/(2XNT_s))} \right| = \left| \frac{\sin(\pi M/(2X))}{M\sin(\pi/(2X))} \right| \quad (5)$$

Positioning signals may significantly attenuate if the number X of signal groups is significantly smaller than the number M of signal blocks. In this case, the signal to noise ratio of a block-averaged group of positioning signals received from the base station may not be able to be increased. Therefore, the positioning signal amplitude attenuation due to frequency deviation shall be kept below an attenuation threshold, for example, 3 dB. For an attenuation threshold of 3 dB, M and X shall satisfy Formula (6).

$$10\log_{10}\left(\left|\frac{\sin(\pi M/(2X))}{M\sin(\pi/(2X))}\right|\right) > -3 \quad (6)$$

Any values of (M, X) that satisfy Formula (6) is allowed in embodiments of the present application.

As an example, X can be 10, and M can be 10.

At 403, each group of positioning signals is frequency compensated, wherein, the range of frequency compensation is no more than one period of a pass-band.

The reason for frequency compensation is explained below.

As shown in FIG. 5, in block averaging, noise component that falls within a stop band is inhibited. The block averaging module can thus be viewed as a comb filter. As known from FIG. 5, the pass-band of the block average response has a period of $1/NT_s$. As such, the period of the pass-band is dependent on the sampling rate and the number of sampling points in a signal block, but independent of the number of signal blocks for block averaging. FIG. 5 also illustrates that the pass-band of the block average response has a main-lobe with a width of $2/NMT_s$. The higher the number of signal blocks, the narrower the pass-band, the wider the stop band, and the more significantly the stop band attenuates. Therefore, the pass-band width and the stop band attenuation both depend on the number of signal blocks. In a case where positioning signals are directly block-averaged after baseband processing, the Doppler frequency L of the positioning signals, which is unknown, may not necessarily falls within the pass-band of the block average response. Therefore, frequency compensation on positioning signals is required before block averaging.

The reason why the range of frequency processing is within one pass-band period is explained below.

Positioning signals as received are divided into X groups. Each group of positioning signals is frequency compensated by a frequency of $\delta f^{(i)}$. If the range of frequency compensation is $(0, 1/NT_s)$, then the frequency difference between each frequency compensated group of positioning signals is $1/XNT_s$, i.e., $\delta f^{(i)} = i/XNT_s$. Because in total X groups of positioning signals are compensated by $1/NT_s$, one of the X groups of positioning signals would fall within the pass-band of the block average response. That is to say, it can be ensured that the $f_d$ of one group of positioning signals falls within the pass-band of block average response.

Specifically, the method of frequency compensation can be implemented as following. With reference to FIG. 1, positioning signals are divided into X groups, and each group of positioning signals are multiplied by a local carrier generated by a local carrier generator, so as to obtain frequency compensated groups of positioning signals. The frequency compensated groups of positioning signals can be represented by Formula (7).

$$r^{(i)}(n) = Ad(nT_s)c(nT_s)e^{j(2\pi f_d^{(i)} nT_s + \varphi_0)} + v(nT_s) \quad (7)$$

wherein, n is serial number of a sampling point, $r^{(i)}(n)$ is the signal of the $n^{th}$ sampling point in the $i^{th}$ group of positioning signals, A is the amplitude of a signal, $d(nT_s)$ is a navigation message of the $n^{th}$ sampling point, $+T_s$ is a pseudo noise code of the $n^{th}$ sampling point, $f_d^{(i)}$ is the frequency of the $i^{th}$ frequency compensated group of positioning signals, $T_s$ is a period of signal sampling, $\varphi_0$ is the carrier phase, and $v(nT_s)$ is the noise of the $n^{th}$ sampling point;

It can be seen that, in embodiments of the present application, signals are frequency compensated in groups, so that at least one of the block-averaged groups of positioning signals falls within the pass-band of block average response. This group of positioning signals produces the highest peak to average ratio after PMF-FFT operation. Based on the peak to average ratio, a determination is made as to whether positioning signals are successfully acquired. Because the noise power of block-averaged positioning signal is reduced, the signal to noise ratio of the positioning signals are increased and success rate for acquisition of positioning signals is increased.

In embodiments of the present application, the block-averaged and frequency compensated positioning signals may be acquired and an acquisition result can be determined in the manners described below.

In the first manner, the result of acquisition can be determined by means of PMF-FFT. The following operations are included.

A PMF-FFT operation is performed on each block-averaged group of positioning signals to obtain an amplitude-frequency response of each group of positioning signals.

A peak to average ratio of each group of positioning signals is determined based on the amplitude-frequency response of that group. The peak to average ratio of the $i^{th}$ group of positioning signals is the ratio of the maximum amplitude in amplitude-frequency response of the $i^{th}$ group of positioning signals to the average amplitude in the $i^{th}$ group:

$$f^{(i)} = \frac{v_{max}^i}{\frac{1}{F}\sum_{n=1}^{F} v_n^i} \quad (8)$$

wherein, $f^{(i)}$ is the peak to average ratio of the $i^{th}$ group of positioning signals, $v_{max}^i$ is the maximum among F amplitudes of the frequency-amplitude response of the $i^{th}$ group of positioning signals, $v_n^i$ is the amplitude of the $n^{th}$ sampling point of the frequency-amplitude response of the $i^{th}$ group of positioning signals, and F is the number of sampling points that are subject to FFT operations.

The average amplitude is the average of a preset number of amplitudes in the amplitude-frequency response of a group of positioning signals, wherein, the preset number is F.

If the highest peak to average ratio among the groups of positioning signals is larger than a preset threshold, the acquisition is determined to be successful. If the highest peak to average ratio among the groups of positioning signals is not larger than a preset threshold, the acquisition is determined to be unsuccessful.

Figure 6:
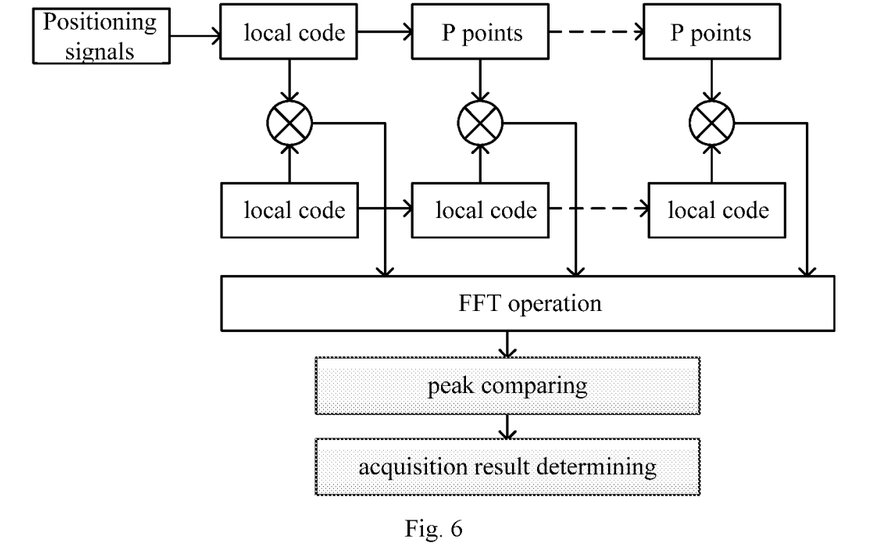
FIG. 6 is a schematic diagram of a PMF-FFT signal acquisition process provided by an embodiment of the present application.

FIG. 6 is a schematic view illustrating a process in which signals are acquired by the PMF-FFT acquisition module, the peak to ratio comparing module, and the acquisition result determining module in FIG. 1. As shown in FIG. 6, partial matched filtering are first performed on each block-averaged group of positioning signals. Assuming the length of each correlator is P and there are in total L correlators, then each group of positioning signals is divided into L blocks, and each block of positioning signals contains P sampling points. Each correlator performs correlated summing of the P sampling points in each block of positioning signals. The partial matched filtering is represented by Formula (9).

$$r_{PMF}^{(i)}(n, f_d^{(i)}) = \sum_{n=Pk}^{P(k+1)-1} r_B^{(i)}(n)l(n) \quad (9)$$

wherein, $r_{PMF}^{(i)}(n, f_d^{(i)})$ is the filtered signal of the $n^{th}$ sampling point of the $i^{th}$ group of positioning signals, n is the serial number of a sampling point, $f_d^{(i)}$ is frequency of the $i^{th}$ frequency compensated group of positioning signals, k is serial number of a correlator, k=0,1, L, L−1, $r_{BA}^{(i)}(n)$ is the block-averaged signal of the $n^{th}$ sampling point in the $i^{th}$ group of positioning signals, and l(n) is the $n^t$ local code generated by a local pseudo code generator.

If the influence of bit reversal and noise is not considered, and local cods are identical with the PRN codes of received positioning signals and have the same phase, Formula (9) can be written as:

$$r_{PMF}^{(i)}(n, f_d^{(i)}) = \sum_{n=Pk}^{P(k+1)-1} r_B^{(i)}(n)l(n) \quad (10)$$

$$= \frac{A\sin(\pi f_d^{(i)} NT_s M)}{M\sin(\pi f_d^{(i)} NT_s)} e^{j2\pi f_d^{(i)} NT_s(M-1)} \cdot \sum_{n=Pk}^{P(k+1)-1} e^{j(2\pi f_d^{(i)} nT_s + \varphi_0)}$$

$$= \left| \frac{A\sin(\pi f_d^{(i)} NT_s M)\sin(\pi f_d PT_s)}{M\sin(\pi f_d^{(i)} NT_s)\sin(\pi f_d T_s)} \right| \cdot e^{j2\pi f_d^{(i)} NT_s(M-1)} e^{j[\pi f_d T_s(P-1+2Pk)+\varphi_0]}$$

Figure 7:
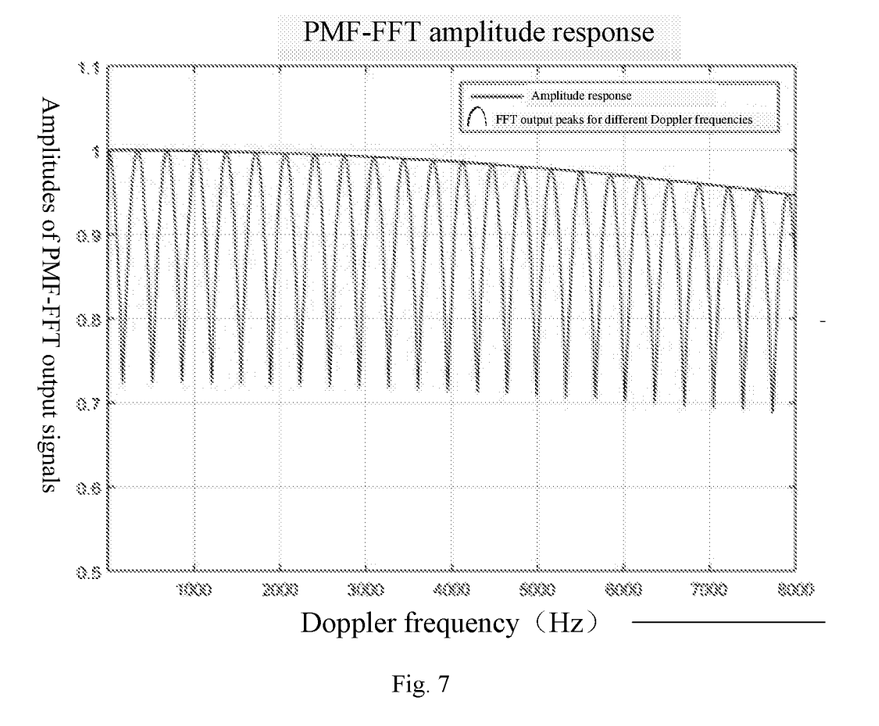
FIG. 7 is a PMF-FFT amplitude-frequency response curve of one group of positioning signals provided by an embodiment of the present application.

Then, zero padding operation is performed on L filtered sampling points obtained by the partial matched filtering, to obtain F sampling points. FFT operation is performed on the F sampling points, wherein, F is an integer power of 2. The amplitude-frequency response of each group of positioning signals obtained after the FFT operation is illustrated by Formula (11). As an example, the PMF-FFT amplitude-frequency response curve of one group of positioning signals is as shown in FIG. 7.

$$G_{FFT}^{(i)}(k, f_d^{(i)}) = |r_{PMF}^{(i)}(n, f_d^{(i)}) H_B(f_d^{(i)})| \quad (11)$$

wherein, $G_{FFT}^{(i)}$ (k, $f_d^{(i)}$) is the amplitude-frequency response of the $k^{th}$ sampling point of the $i^{th}$ group of positioning signals, k is the serial number of a correlator, k=0,1,L, L−1, $f_d^{(i)}$ is the frequency of the $i^{th}$ frequency compensated group of positioning signals, $r_{PMF}^{(i)}(n, f_d^{(i)})$ is the filtered signal of the $n^{th}$ sampling point of the $i^{th}$ group of positioning signals, and $H_B(f_d^{(i)})$ is the block-averaged response of the $i^{th}$ group of positioning signals.

It can be seen from the result of the FFT operation that, the frequency resolution of the $i^{th}$ group of positioning signals is ½PFT$_s$. The frequency search range is ±½PT$_s$. When a local code and the pseudo code of a positioning signal are identical and have the same phase, the amplitude-frequency response curve of the $i^{th}$ group of positioning signals obtained by FFT will produce the highest peak at k=$f_d^{(i)}$PT$_s$F.

Based on the amplitude-frequency response output by FFT, the highest peak to average ratio among the X groups of signals is calculated. The peak to average ratio of each group of positioning signals is the ratio of the maximum amplitude to the average amplitude of the amplitude-frequency response of that group. An average amplitude is the average of a preset number of amplitudes of the amplitude-frequency response of a group of positioning signals. The highest peak to average ratio is compared to a preset threshold value.

As an example, the threshold value can be 1:5.

If the highest peak to average ratio among the groups of positioning signals is larger than 1.5, then the acquisition is determined to be successful.

If the highest peak to average ratio among the groups of positioning signals is not larger than 1.5, then the acquisition is determined to be unsuccessful.

In embodiments of the present application, there are four situations of positioning signal acquisition: signals exist and acquisition is successful; signals exist but acquisition is unsuccessful; signals do not exist but acquisition is successful; signals do not exist and acquisition is unsuccessful. The probability that existing signals are successfully acquired is a true alarm rate, and the probability that signals do not exist and acquisition is successful is a false alarm rate. The true alarm rate and the false alarm rate should be considered to set an appropriate threshold value.

After partial matched filtering, the noise of L sampling points as obtained is in a normal distribution with an average of 0 and a variance of $\sigma^2$. Therefore, after FFT operation on these L sampling points, the noise will be in a normal distribution with an average of 0 and a variance of $\sigma_{FFT}^2 = F\sigma^2$. Based on knowledge of the probability theory, the FFT amplitude-frequency response curve is in a Rice distribution if positioning signals exist, and is in Rayleigh distribution of positioning signals do not exist. Assuming the probability density function of the FFT amplitude-frequency response is $f_s(v)$ when a positioning signal exists, and is $f_n(v)$ when a positioning signal does not exist, then the false alarm rate $P_{fa}$ satisfies Formula (12):

$$P_{fa} = 1 - [\int_0^{v_t} f_n(v) dv]^F \quad (12)$$

The true alarm rate $P_d$ satisfies Formula (13):

$$P_d = \int_{v_t}^{\infty} f_s(v) dv [\int_0^{v_t} f_n(v) dv]^{F-1} \quad (13)$$

wherein, F is the number of sampling points that are subject to FFT operation, v is the amplitude of a positioning signal, and $v_t$ is a threshold.

The threshold $v_t$ shall ensure that $P_{fa}$ is smaller than a false alarm rate threshold and $P_d$ is larger than a true alarm rate threshold.

For example, the false alarm rate threshold may be 0.1% or 1%, and the true alarm rate threshold may be 95% or 90%.

In the second Manner, Fast Fourier Transformation and Fast Inverse Fourier Transformation are used in combination to acquire a positioning signal. The following operations are included.

Figure 8:
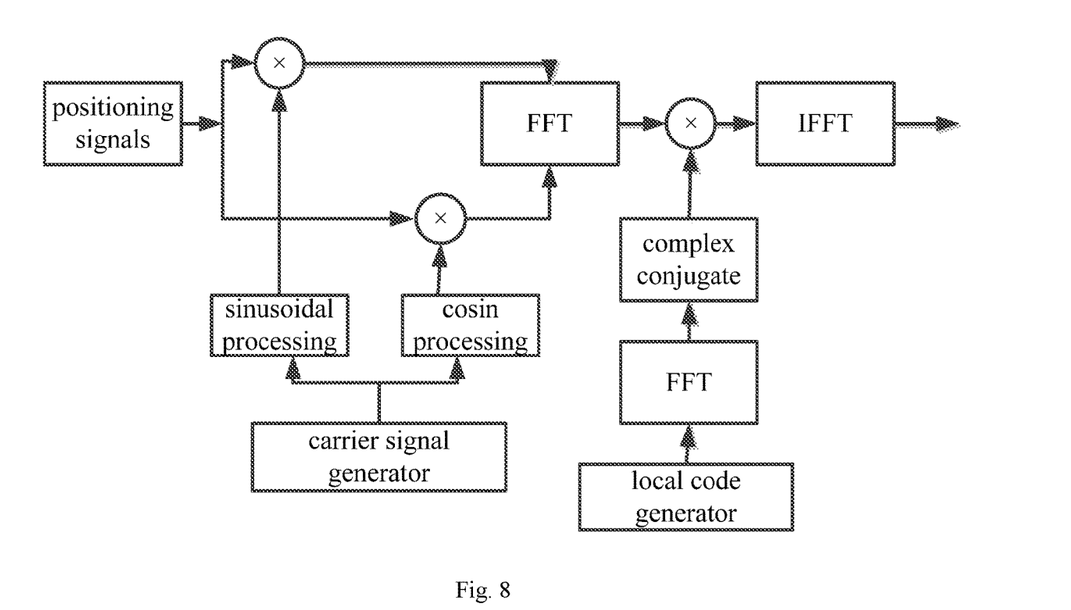
FIG. 8 is a flowchart of an operation method provided by an embodiment of the present application, in which Fast Fourier Transformation and Fast Inverse Fourier Transformation are used in combination.

Referring to FIG. 8, which is a flow chart of a operation process to combine Fast Fourier Transformation and Fast Inverse Fourier Transformation provided by an embodiment of the present application. The method comprises the following operations.

A carrier signal generated by a carrier oscillator is subject to sinusoidal processing and cosin processing, and then subject to Fast Fourier Transformation with a frequency compensated and block-averaged positioning signal. The positioning obtained by Fast Fourier Transformation is multiplied by a local pseudo code generated by a local pseudo code generator after Fast Fourier Transformation and complex conjugate operation. The positioning signal as produced is subject to Fast Inverse Fourier Transformation, so as to obtain a code phase and a Doppler frequency. A successful acquisition of the positioning signal is determined based on the code phase and the Doppler frequency.

Further, after determining whether a positioning signal received is successfully acquired, an estimated code phase of the positioning signal received can be calculated as described below.

As described in the first manner, a local code is multiplied by each block-averaged group of signals, and FFT operation is performed on the product to obtain the amplitude-frequency response of each block-averaged group of signals. When the local code of a group of positioning signals is roughly aligned with the pseudo code of the group of positioning signals, the amplitude-frequency response curve of the group of positioning signals will have a peak value at the maximum amplitude of the amplitude-frequency response of the group of positioning signals. The corresponding local code at this point is the estimated code phase of that group of positioning signals.

Generally, the estimated code phases of M groups of positioning signals are approximately identical. Therefore, the estimated code phase of any group of positioning signals or the estimated code phase of the group of positioning signals that has the highest peak to average ration can be selected as the estimated code phase of the positioning signals from a base station. However, when the estimated code phases of M groups of positioning signals are different, the estimated code phase of the group of positioning signals that has the highest peak to average ration among the M groups of positioning signals is selected as the estimated code phase of the positioning signals as received.

Further, after the determination whether a positioning signal is successfully acquired, an estimated frequency, i.e., an estimated Doppler frequency, of the positioning signal received from a base station can also be calculated. This comprises the following operations.

Based on the amplitude-frequency response and the group of positioning signals that has the highest peak to average ratio as obtained using the first manner of determining an acquisition result, a preliminary estimated Doppler frequency of the positioning signal $f_{cal}^{(i)}$ be obtained by:

$$f_{cal}^{(i)} = \begin{cases} k/PFT_s, & k \leq F/2 \\ (k-F)/PFT_s, & k > F/2 \end{cases} \quad (14)$$

wherein, k is the serial number of a correlator, P is the number of sampling points in a correlator, F is the number of sampling points subject to FFT operation, and $T_s$ is a period of positioning signal sampling.

As described in operation 403, the group of positioning signals that has the highest peak to average ratio is within the pass-band of the block average response. Therefore, the frequency of this group of signals can be considered to be an integer multiple of $1/NT_s$. Thus, an estimated Doppler frequency $f_d'$ of the positioning signals can be obtained as:

$$f_d' = \text{round}(f_{cal}^{(i)}/(1/NT_s))/NT_s - \delta f^{(i)} \quad (15)$$

wherein, round represents the operation of taking the integer that is closest to the calculation result, $f_{cal}^{(i)}$ is a preliminary estimated frequency, N is the number of sampling points in a signal block, $T_s$ is a period for sampling positioning signals, and $\delta f^{(i)}$ is the frequency by which the $i^{th}$ group of positioning signals is compensated.

As shown by Formula (15), the precision of the estimated Doppler frequency depends on $1/XNT_s$. As $\delta f^{(i)} = i/ZNT_s$, the smaller the step of frequency compensation, the more precise the estimated Doppler frequency estimation value.

It should be noted that, in a conventional PMF-FFT acquisition method, an estimated Doppler frequency is calculated according to Formula (14), which illustrates that the precision of an estimated Doppler frequency is $1/PFT_s$. The precision of an estimated Doppler frequency provided by embodiments of the present application is $1/XNT_s$. Because $1/PFT_s > 1/XNT_s$, embodiments of the present application can obtain a more precise estimated Doppler frequency.

The fact that $1/PFT_s > 1/XNT_s$ can be proved as below.

P is the number of sampling points in a correlator, L is the number of correlators, N is the number of sampling points in a signal block, and X is the number of signal blocks in each group of positioning signals.

As described in the first manner of determining an acquisition result, N=PL, and zero padding is needed so that L sampling points are transforms into F sampling points. Thus, it can be derived that: L<F<2L. Therefore, PF<2PL=2N. PF<XN when X≥1. Because positioning signals are divided into at least two groups, it can be derived that X≥2. Therefore, $1/PFT_s > 1/XNT_s$.

It can be seen that, an estimated Doppler frequency of positioning signals provided by embodiments of the present application is more precise in comparison with an estimated Doppler frequency of positioning signals provided by a conventional PMF-FFT acquisition method. On one hand, a more precise estimated Doppler frequency can enable a receiver to have a quick transfer to a precise tracking status after positioning signals are successfully acquired. On the other hand, when positioning signals received are weak signals, a more precise estimated Doppler frequency can allow a quick pull-in of the signals and thus a faster transfer into a precise tracking phase. This allows quick acquisition of precise ranging information.

Figure 9:
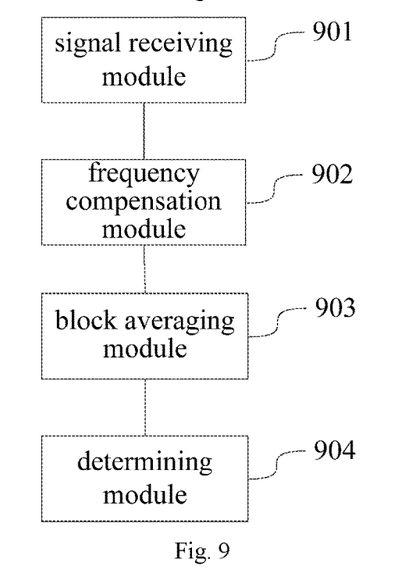
FIG. 9 is a schematic structural diagram of a signal acquisition device provided by an embodiment of the present application.

Referring to FIG. 9, a signal acquisition device provided by an embodiment of the present application is illustrated. The device includes: a signal receiving module 901, configured for receiving positioning signals sent by a base station; a frequency compensation module 902, configured for dividing the positioning signals received by the signal receiving module into at least two groups and performing frequency compensation on each group of positioning signals; a block averaging module 903, configured for dividing each frequency compensated group of positioning signals into at least two signal blocks, and performing an averaging operation on the signal blocks in each group of signals, so as to obtain block-averaged groups of positioning signals; a determining module 904, configured for dividing each frequency compensated group of positioning signals into at least two signal blocks, and performing an averaging operation on the signal blocks in each group of signals, so as to obtain block-averaged groups of positioning signals.

Specifically, the frequency compensation module 902 may comprise a sampling unit, a grouping unit, and a frequency compensation unit; the sampling unit is configured for performing analog to digital conversion on the positioning signals sent by the base station, and sampling the positioning signals at a preset sampling rate; the grouping unit is configured for dividing the positioning signals into at least two groups based on a result of the sampling from the sampling unit; the frequency compensation unit is configured for performing frequency compensation on each group of positioning signals divided by the grouping unit, with a range for the frequency compensation being no more than one period of a pass-band.

Specifically, the block averaging module 903 is specifically configured for: dividing each frequency compensated group of positioning signals into at least two signal blocks, each of which comprising the same number of sampling points; for each group of positioning signals, performing an averaging operation on sampling points at the same positions in the signal blocks to obtain the block-averaged group of positioning signals.

Specifically, he frequency compensated group of positioning signal is represented by:

$$r^{(i)}(n) = Ad(nT_s)c(nT_s)e^{j(2\pi f_d^{(i)} nT_s + \varphi_0)} + v(nT_s)$$

wherein, n is a serial number of a sampling point, $r^{(i)}(n)$ is a signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ frequency compensated group of positioning signals, $T_s$ represents a period of signal sampling, $\varphi_0$ is a carrier phase, and $v(nT_s)$ is a noise of the $n^{th}$ sampling point; each block-averaged group of positioning signals is represented by:

$$r_B^{(i)}(n) = Ad(nT_s)c(nT_s)e^{j(2\pi f_d^{(i)} nT_s + \varphi_0)} H_B(f_d^{(i)}) + v_B(nT_s)$$

wherein, n is a serial number of a sampling point, $r_B^{(i)}(n)$ is a block-averaged signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ group of positioning signals, $T_s$ represents a period of signal sampling, $\varphi_0$ is a carrier phase, $H_B(f_d^{(i)})$ is a block average response of the $i^{th}$ group of positioning signals, and $v_B(nT_s)$ is a component of a block-averaged noise at the $n^{th}$ sampling point.

Specifically, the determining module 904 may comprise an operation unit, a peak to average ratio determining unit, a determining unit, a decision unit, and a parameter estimating unit.

The operation unit is configured for performing a PMF-FFT operation on each block-averaged group of positioning signals to obtain an amplitude-frequency response of each group of positioning signals.

The peak to average ratio determining unit is configured for determining a peak to average ratio of each group of positioning signals based on the amplitude-frequency response of each group of positioning signals, the peak to average ratio of a group of positioning signals being a ratio of a maximum amplitude to an average amplitude in the amplitude-frequency response of the group of positioning signals, the average amplitude being an average of a preset number of amplitudes in the amplitude-frequency response of a group of positioning signals.

The determining unit is configured for determining a group of positioning signals that has the highest peak to average ratio among the at least two groups of positioning signals.

The decision unit is configured for determining the acquisition result to be successful if the highest peak to average ratio among the groups of position signals is higher than a preset threshold, and determining the acquisition result to be unsuccessful if the highest peak to average ratio among the groups of position signals is not higher than a preset threshold value.

The parameter estimating unit is configured for, if the acquisition result is determined to be successful, determining an estimated code phase and an estimated frequency of the positioning signals received from the base station based on the group of positioning signals that has the highest peak to average ratio among the at least two groups of positioning signals.

Embodiments of the present application provide a signal acquisition device. Positioning signals as received can be divided into at least two groups and frequency compensation is performed on each group of positioning signals. Each frequency compensated group of positioning signals is divided into at least two signal blocks, and an averaging operation is performed on the signal blocks in each group of signals, so as to obtain block-averaged groups of positioning signals. An acquisition result is determined based on the block-averaged groups of positioning signals. Noise power of each block averaged group of positioning signals is reduced. Therefore, noise power of received positioning signals can be reduced in the embodiment of the present application. This may improve signal-to-noise ratio of received signals and acquisition sensitivity of a receiver. Acquisition success rate of weak signals is thus increased.

The incorporation of frequency estimation and block averaging with signal acquisition can improve the precision of an estimated frequency. Embodiments of the present application can be used to obtain a more accurate estimated frequency during signal acquisition.

Figure 10:
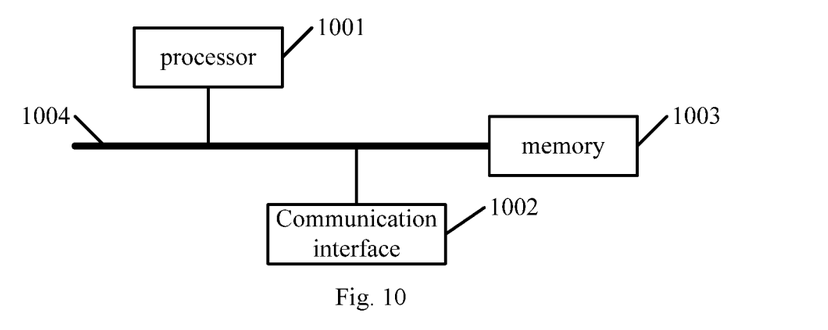
FIG. 10 is a schematic structural diagram of an electronic device provided by an embodiment of the present application.

An embodiment of the present application also provides an electronic device. As shown in FIG. 10, the device comprises a processor 1001, a communication interface 1002, a memory 1003, and a communication bus 1004. The processor 1001, the communication interface 1002, and the memory 1003 communicate with each other via the communication bus 1004.

The memory 1003 has a computer program stored thereon.

The processor 1001 executes the computer program in the memory 1003 to perform the operations executed by the electronic device in the method embodiments as described above.

Embodiments of the present application provide a signal acquisition device. Positioning signals as received can be divided into at least two groups and frequency compensation is performed on each group of positioning signals. Each frequency compensated group of positioning signals is divided into at least two signal blocks, and an averaging operation is performed on the signal blocks in each group of signals, so as to obtain block-averaged groups of positioning signals. An acquisition result is determined based on the block-averaged groups of positioning signals. Noise power of each block averaged group of positioning signals is reduced. Therefore, noise power of received positioning signals can be reduced in the embodiment of the present application. This may improve signal-to-noise ratio of received signals and acquisition sensitivity of a receiver. Acquisition success rate of weak signals is thus increased.

The incorporation of frequency estimation and block averaging with signal acquisition can improve the precision of an estimated frequency. Embodiments of the present application can be used to obtain a more accurate estimated frequency during signal acquisition.

The communication bus mentioned in the above electronic device may be a Peripheral Component Interconnect (PCI) bus or an Extended Industry Standard Architecture (EISA) bus. The communication bus may include an address bus, a data bus, a control bus, and the like. For convenience of representation, the communication bus is denoted with a single line in the figures, but this does not limit the number or type of a communication bus.

The communication interface is used by the electronic device to communicate with another device.

The memory may include a random access memory (RAM), and may also include a non-volatile memory (NVM), such as at least one disk storage. Optionally, the memory may also be at least one storage device located away from the aforementioned processor.

The processor may be a general purpose processor such as a central processing unit (CPU) or network processor (NP). The processor may also be a digital signal processor (DSP), an application specific integrated circuit (ASIC), a programmable logic device such as a field programmable gate array (FPGA), discrete gates or transistor logic devices, or an assembly of discrete hardware.

In still another embodiment of the present application, a computer readable storage medium having a computer program stored thereon which, when executed by a processor, performs the operations of the method according to any one of claims 1-5.

In still another embodiment of the present application, a computer program product which, when being executed by a computer, causes the computer to perform the operations of the method according to any of claims 1-5.

Above examples can be implemented fully or partially in software, hardware, firmware or any combination thereof. In a software implementation, the examples can be embodied fully or partially in a computer program product comprising one or more computer instructions. The computer instruction(s), when loaded and executed on a computer, implement some or all of the flows or functions according to the examples of the present disclosure. The computer may be a general purpose computer, a special purpose computer, a computer network or other programmable device. The computer instructions may be stored on a computer readable storage medium, or transmitted from one computer readable storage medium to another. For example, the computer instructions can be transmitted from a website, computer, server or data center to another website, computer, server or data center via a wired (e.g., coaxial cable, optical fiber, or digital subscriber (DSL)) or wireless (e.g., infrared, radio or microwave) connection. The computer readable storage medium may be any available medium accessible to a computer, or a data storage device, such as a server or data center, having one or more available medium integrated therein. The available medium may be a magnetic medium (e.g., software, hardware or magnetic tape), an optical medium (e.g., DVD), or a semiconductor medium (e.g., solid state disk (SSD)).

In an example, relationship terms such as "first", "second", and the like in the specification are solely for distinguishing one entity or operation from another, but do not necessarily require or imply that there is any actual relationship or order between these entities or operations. Moreover, terms such as "include", "comprise" or any other variants thereof are intended to be non-exclusive, so that processes, methods, articles or devices comprising a series of elements may comprise not only those elements listed but also those not explicitly listed or the elements intrinsic to these processes, methods, articles, or devices. Without further limitations, elements defined by the wording "comprise(s) a" or "include(s) a" do not exclude that there are other identical elements in the processes, methods, articles, or devices which include these elements.

All of the examples in the description are described in a correlated manner, and description of a component in an example may apply to another containing the same. The description for each example focuses on the differences from other examples. In particular, a brief description is provided to examples of apparatuses and devices in view of their resemblance with the method examples. Relevant details can be known with reference to the description of the method examples.

The examples described above are only preferable examples of the present disclosure, and are not intended to limit the scope of protection of the present disclosure. Any modification, equivalent, and improvement within the spirit and principle of the present disclosure are all within the scope of protection of the present disclosure.

The invention claimed is:

1. A signal acquisition method, comprising:

receiving positioning signals sent by a base station;

dividing the positioning signals into at least two groups and performing frequency compensation on each group of positioning signals;

dividing each frequency compensated group of positioning signals into at least two signal blocks, and performing an averaging operation on the signal blocks in each group of signals, so as to obtain block-averaged groups of positioning signals; and determining an acquisition result based on the block-averaged groups of positioning signals comprising the steps of:

performing a partial matched filtering-fast Fourier transform (PMF-FFT) operation on each block-averaged group of positioning signals to obtain an amplitude-frequency response of each group of positioning signals;

determining a peak to average ratio of each group of positioning signals based on the amplitude-frequency response of each group of positioning signals, the peak to average ratio of a group of positioning signals being a ratio of a maximum amplitude to an average amplitude in the amplitude-frequency response of the group of positioning signals, the average amplitude being an average of a preset number of amplitudes in the amplitude-frequency response of a group of positioning signals;

determining a group of positioning signals that has the highest peak to average ratio among the at least two groups of positioning signals;

determining the acquisition result to be successful if the highest peak to average ratio among the groups of position signals is higher than a preset threshold, and determining the acquisition result to be unsuccessful if the highest peak to average ratio among the groups of position signals is not higher than a preset threshold value; and if the acquisition result is determined to be successful, determining an estimated code phase and an estimated frequency of the positioning signals received from the base station based on the group of positioning signals that has the highest peak to average ratio among the at least two groups of positioning signals.

2. The method according to claim 1, wherein, dividing the positioning signals into at least two groups and performing frequency compensation on each group of positioning signals comprises:

performing analog to digital conversion on the positioning signals sent by the base station, and sampling the positioning signals at a preset sampling rate;

dividing the positioning signals into at least two groups based on a result of the sampling; and performing frequency compensation on each group of positioning signals, with a range for the frequency compensation being no more than one period of a passband.

3. The method according to claim 2, wherein, dividing each frequency compensated group of positioning signals into at least two signal blocks and performing an averaging operation on the signal blocks in each group of signals so as to obtain block-averaged groups of positioning signals comprises:
dividing each frequency compensated group of positioning signals into at least two signal blocks, each of which comprising the same number of sampling points;
for each group of positioning signals, performing an averaging operation on sampling points at the same positions in the signal blocks to obtain the block-averaged group of positioning signals.

4. The method according to claim 3, wherein, the frequency compensated group of positioning signal is represented by:

$$r^{(i)}(n) = Ad(nT_s)c(nT_s)e^{j(2\pi f_d^{(i)} nT_s + \varphi_0)} + v(nT_s)$$

wherein, n is a serial number of a sampling point, $r^{(i)}(n)$ is a signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ frequency compensated group of positioning signals, $T_s$ represents a period of signal sampling, $\varphi_0$ is a carrier phase, and $v(nT_s)$ is a noise of the $n^{th}$ sampling point;
each block-averaged group of positioning signals is represented by:

$$r_B^{(i)}(n) = Ad(nT_s)c(nT_s)e^{j(2\pi f_d^{(i)} nT_s + \varphi_0)} H_B(f_d^{(i)}) + v_B(nT_s)$$

wherein, n is a serial number of a sampling point, $r_B^{(i)}(n)$ is a block-averaged signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ group of positioning signals, $T_s$ represents a period of signal sampling, $\varphi_0$ is a carrier phase, $H_B(f_d^{(i)})$ is a block average response of the $i^{th}$ group of positioning signals, and $v_B(nT_s)$ is a component of a block-averaged noise at the $n^{th}$ sampling point.

5. A signal acquisition device, wherein the device comprises:
a signal receiving module configured for receiving positioning signals sent by a base station;
a frequency compensation module configured for dividing the positioning signals received by the signal receiving module into at least two groups and performing frequency compensation on each group of positioning signals;
a block averaging module configured for dividing each frequency compensated group of positioning signals into at least two signal blocks, and performing an averaging operation on the signal blocks in each group of signals, so as to obtain block-averaged groups of positioning signals; and
a determining module configured for determining an acquisition result based on the block-averaged groups of positioning signals, comprising an operation unit, a peak to average ratio determining unit, a determining unit, a decision unit, and a parameter estimating unit; wherein the operation unit is configured for performing a PMF-FFT operation on each block-averaged group of positioning signals to obtain an amplitude-frequency response of each group of positioning signals;
the peak to average ratio determining unit is configured for determining a peak to average ratio of each group of positioning signals based on the amplitude-frequency response of each group of positioning signals, the peak to average ratio of a group of positioning signals being a ratio of a maximum amplitude to an average amplitude in the amplitude-frequency response of the group of positioning signals, the average amplitude being an average of a preset number of amplitudes in the amplitude-frequency response of a group of positioning signals;
the determining unit is used for determining a group of positioning signals that has the highest peak to average ratio among the at least two groups of positioning signals;
the decision unit is configured for determining the acquisition result to be successful if the highest peak to average ratio among the groups of position signals is higher than a preset threshold, and determining the acquisition result to be unsuccessful if the highest peak to average ratio among the groups of position signals is not higher than a preset threshold value; and
the parameter estimating unit is configured for, if the acquisition result is determined to be successful, determining an estimated code phase and an estimated frequency of the positioning signals received from the base station based on the group of positioning signals that has the highest peak to average ratio among the at least two groups of positioning signals.

6. The device according to claim 5, wherein, the frequency compensation module comprises a sampling unit, a grouping unit, and a frequency compensation unit;
the sampling unit is configured for performing analog to digital conversion on the positioning signals sent by the base station, and sampling the positioning signals at a preset sampling rate;
the grouping unit is configured for dividing the positioning signals into at least two groups based on a result of the sampling from the sampling unit; and
the frequency compensation unit is configured for performing frequency compensation on each group of positioning signals divided by the grouping unit, with a range for the frequency compensation being no more than one period of a passband.

7. The device according to claim 6, wherein, the block averaging module is further configured for:
dividing each frequency compensated group of positioning signals into at least two signal blocks, each of which comprising the same number of sampling points;
for each group of positioning signals, performing an averaging operation on sampling points at the same positions in the signal blocks to obtain the block-averaged group of positioning signals.

8. The device according to claim 7, wherein, the frequency compensated group of positioning signal is represented by:

$$r^{(i)}(n) = Ad(nT_s)c(nT_s)e^{j(2\pi f_d^{(i)} nT_s + \varphi_0)} + v(nT_s)$$

wherein, n is a serial number of a sampling point, $r^{(i)}(n)$ is a signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the nth sampling point, $f_d^{(i)}$ is a frequency of the $i^{th}$ frequency compensated group of positioning signals, $T_s$ represents a period of signal sampling, $\varphi_0$ is a carrier phase, and $v(nT_s)$ is a noise of the $n^{th}$ sampling point;

each block-averaged group of positioning signals is represented by:

$$r_B^{(i)}(n)=Ad(nT_s)c(nT_s)e^{j(2\pi f_d^{(i)}nT_s+\varphi_0)}H_B(f_d^{(i)})+v_B(nT_s)$$

wherein, n is a serial number of a sampling point, $r_B^{(i)}(n)$ is a block-averaged signal at the $n^{th}$ sampling point in the $i^{th}$ group of positioning signals, A is an amplitude of a signal, $d(nT_s)$ is a navigation message of the $n^{th}$ sampling point, $c(nT_s)$ is a pseudo noise code of the $n^{th}$ sampling point, $f_d^{(i)}$ is a frequency of the $i^{th}$ group of positioning signals, $T_s$ represents a period of signal sampling, $\varphi_0$ is a carrier phase, $H_B(f_d^{(i)})$ is a block average response of the $i^{th}$ group of positioning signals, and $v_B(nT_s)$ is a component of a block-averaged noise at the $n^{th}$ sampling point.

9. An electronic device, comprising a processor, a communication interface, a memory, and a communication bus, wherein, the processor, the communication interface, and the memory communicate with each other via the communication bus;

the memory has a computer program stored thereon;

the processor executes the computer program to perform the operations of the method according to claim 1.

10. A non-transitory computer readable storage medium having a computer program stored thereon which, when executed by a processor, performs the operations of the method according to claim 1.

11. The method according to claim 1, wherein the number M of signal blocks and the number X of signal groups satisfy:

$$10\log_{10}\left(\left|\frac{\sin(\pi M/(2X))}{M\sin(\pi/(2X))}\right|\right) >$$

a negative of an attenuation threshold.

12. The method according to claim 5, wherein the number M of signal blocks and the number X of signal groups satisfy:

$$10\log_{10}\left(\left|\frac{\sin(\pi M/(2X))}{M\sin(\pi/(2X))}\right|\right) >$$

a negative of an attenuation threshold.

\* \* \* \* \*

UNITED STATES PATENT AND TRADEMARK OFFICE
CERTIFICATE OF CORRECTION

PATENT NO. : 11,303,485 B2
APPLICATION NO. : 16/647171
DATED : April 12, 2022
INVENTOR(S) : Zhongliang Deng et al.

It is certified that error appears in the above-identified patent and that said Letters Patent is hereby corrected as shown below:

In the Specification

Column 3, Line 42, delete "$r_B^{(i)}(n) = Ad(nT_s)c(nT_s)e^{j(2\pi f_d^{(i)} nT_s + \varphi_0)} H_B(f_d^{(i)} + v_B(nT_s))$," and insert --$r_B^{(i)}(n) = Ad(nT_s)c(nT_s)e^{j(2\pi f_d^{(i)} nT_s + \varphi_0)} H_B(f_d^{(i)}) + v_B(nT_s)$--.

Column 7, Line 4, delete "$H_B(f_d^{(i)}$" and insert --$H_B(f_d^{(i)})$--.

Column 9, Line 24, delete "$L$" and insert --$f_d$--.

Column 9, Line 33, delete "$\delta \quad f^{(i)}$" and insert --$\delta f^{(i)}$--.

Column 9, Line 36, delete "$\delta \quad f^{(i)} = i/XNT_s$," and insert --$\delta f^{(i)} = i/XNT_s$--.

Column 9, Line 55, delete "$+T_s)$" and insert --$c(nT_s)$--.

Column 11, Line 2, delete "$k=0,1, L, L-1$," and insert --$k=0,1,\ldots,L-1$--.

Column 11, Line 36, delete "$k=0,1, L, L-1$," and insert --$k=0,1,\ldots,L-1$,--.

Column 11, Line 39, delete "$H_B(f_d^{(i)}$" and insert --$H_B(f_d^{(i)})$--.

Column 13, Line 59, delete "$f_d' = round(f_{cd}^{(i)}/(1/NT_s)/NT_s - \delta f^{(i)}$," and insert --$f_d' = round(f_{cd}^{(i)}/(1/NT_s))/NT_s - \delta f^{(i)}$--.

Column 13, Line 67, delete "$\delta \quad f^{(i)} = i/ZNT_s$," and insert --$\delta f^{(i)} = i/XNT_s$--.

Column 14, Line 21, delete "X≥1" and insert -- X≥2--.

Signed and Sealed this
Fifth Day of July, 2022

Katherine Kelly Vidal
*Director of the United States Patent and Trademark Office*